(12) United States Patent
Wang et al.

(10) Patent No.: US 10,969,808 B2
(45) Date of Patent: Apr. 6, 2021

(54) ON-TIME TIMER CIRCUIT WITH EXTERNAL CLOCK FOR SWITCHING CONVERTER CONTROL

(71) Applicant: TEXAS INSTRUMENTS INCORPORATED, Dallas, TX (US)

(72) Inventors: Zejing Wang, Shanghai (CN); Zhujun Li, Shanghai (CN)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 16/685,357

(22) Filed: Nov. 15, 2019

(65) Prior Publication Data

US 2020/0310475 A1    Oct. 1, 2020

Related U.S. Application Data

(60) Provisional application No. 62/827,638, filed on Apr. 1, 2019.

(51) Int. Cl.
  *G05F 1/46* (2006.01)
  *H02M 1/14* (2006.01)
  *H02M 3/158* (2006.01)
  *H02M 1/00* (2006.01)

(52) U.S. Cl.
  CPC ............ *G05F 1/46* (2013.01); *H02M 1/14* (2013.01); *H02M 3/158* (2013.01); *H02M 2001/0003* (2013.01)

(58) Field of Classification Search
  CPC ........... G05F 1/46; H02M 1/14; H02M 3/158; H02M 2001/0003
  See application file for complete search history.

(56) References Cited

U.S. PATENT DOCUMENTS

| | | | |
|---|---|---|---|
| 8,407,528 | B2 | 3/2013 | Larson |
| 9,136,703 | B2 | 9/2015 | Cummings |
| 2004/0095116 | A1 | 5/2004 | Kernahan |
| 2012/0019225 | A1 | 1/2012 | Tsai |
| 2017/0099011 | A1 | 4/2017 | Freeman |
| 2018/0115242 | A1* | 4/2018 | Drake ................... H02M 3/158 |
| 2018/0166971 | A1 | 6/2018 | Pldutti |
| 2019/0393868 | A1* | 12/2019 | Zhang ........................ G06F 1/12 |
| 2020/0136494 | A1* | 4/2020 | Kazama .................. H02M 1/08 |

OTHER PUBLICATIONS

PCT Search Report dated Jun. 25, 2020.

* cited by examiner

Primary Examiner — Kyle J Moody
Assistant Examiner — Lakaisha Jackson
(74) Attorney, Agent, or Firm — Lawrence J. Bassuk; Charles A. Brill; Frank D. Cimino (57) ABSTRACT

A switching converter controller includes an on-time timer circuit coupled to a switch driver circuit. The on-time timer circuit includes an up/down counter with a clock input node. The on-time timer circuit also includes a latch with an input coupled to an external clock signal and with an output coupled to the clock input node. The on-time timer circuit also includes an on-time capacitor array with a control terminal coupled an output of the up/down counter.

19 Claims, 11 Drawing Sheets

FIG. 12 ical system designs and components are ongoing and
ON-TIME TIMER CIRCUIT WITH EXTERNAL CLOCK FOR SWITCHING CONVERTER CONTROL

CROSS-REFERENCE TO RELATED APPLICATIONS

This application claims priority to U.S. Provisional Application No. 62/827,638, filed Apr. 1, 2019, which is hereby incorporated by reference.

BACKGROUND

There are many different electrical system designs, each appropriate for a given scenario. Efforts to improve on electrical system designs and components are ongoing and involve commercialization of different system components. The use of semiconductor technology and the proliferation of consumer and industrial applications for semiconductor-based circuits drive product development. In summary, there is a competition to provide low-cost and functional electrical system components for use in consumer and industrial applications around the world.

Power management circuits are needed for many electrical system designs. A constant on-time control method is popular in power management system because it can achieve good load transient performance. Also, in many personal electronics or industrial applications, the application system needs special functions such as output ripple reduction and out of audio, where on-time control is appropriate. One way to provide the on-time involves an on-time capacitor or on-time capacitor array, Controlling the on-time capacitor or on-time capacitor array is not a trivial task.

SUMMARY

In accordance with at least one example of the disclosure, an electrical system comprises a battery configured to provide an input supply voltage. The electrical system also comprises a switching converter coupled to the battery, wherein the switching converter circuitry includes a power switch. The electrical system also comprises a load coupled to an output of the switching converter. The electrical system also includes a control circuit coupled to the power switch. The control circuit comprises a switch driver circuit coupled to the power switch. The control circuit also comprises a summing comparator circuit configured to output a first control signal that indicates when to turn the power switch on. The control circuit also comprises an on-time timer circuit configured to output a second control signal separate from the first control signal. The second control signal is separate from the first control signal and is based on a latched external clock signal.

In accordance with at least one example of the disclosure, a switching converter comprises a power switch and a control circuit coupled to the power switch. The control circuit comprises a switch driver circuit and a summing comparator circuit coupled to the switch driver circuit. The control circuit also comprises an on-time timer circuit coupled to the switch driver circuit. The on-time timer circuit comprises an up/down counter with a clock input node. The on-time timer circuit also comprises a latch with an input coupled to an external clock signal and with an output coupled to the clock input node. The on-time timer circuit also comprises an on-time capacitor array with a control terminal coupled an output of the up/down counter.

In accordance with at least one example of the disclosure, a switching converter controller comprises an on-time timer circuit coupled to the switch driver circuit. The on-time timer circuit comprises an up/down counter with a clock input node. The on-time timer circuit also comprises a latch with an input coupled to an external clock signal and with an output coupled to the clock input node. The on-time timer circuit also comprises an on-time capacitor array with a control terminal coupled an output of the up/down counter.

BRIEF DESCRIPTION OF THE DRAWINGS

For a detailed description of various examples, reference will now be made to the accompanying drawings in which.

DETAILED DESCRIPTION

Disclosed herein are switching converter topologies with constant on-time control. In the proposed switching converter topologies, the constant on-time control is based in part on an on-time timer circuit with an up/down counter having a latched clock input. In the proposed examples, the latched clock input of the up/down counter is based on an external clock signal. Consistent with the present disclosure, an external clock may encompass a clock signal independent of a converter's switching frequency (e.g., the frequency at a switching converter's switch node). Also, the proposed on-time timer circuit uses a low-side switch blanking time signal to ensure an on-time capacitor array finishes discharging to zero. In some examples, the latch used to provide a latched clock input to the up/down counter of the on-time timer circuit corresponds to a D-type (D) flip-flop, where the low-side switch blanking time signal is one of the inputs to the D flip-flop to avoid abrupt changes to the on-time and thus smooth on-time control changes are achieved. With the proposed constant on-time control options, abrupt on-time changes are avoided and better load/line transient response is achieved. Compared to other constant on-time controllers, the proposed constant on-time control options avoid randomly changing the on-time during line/load transients or power on/off events. For a better understanding, various related switching converter options and issues are described using the figures as follows.

Figure 1:
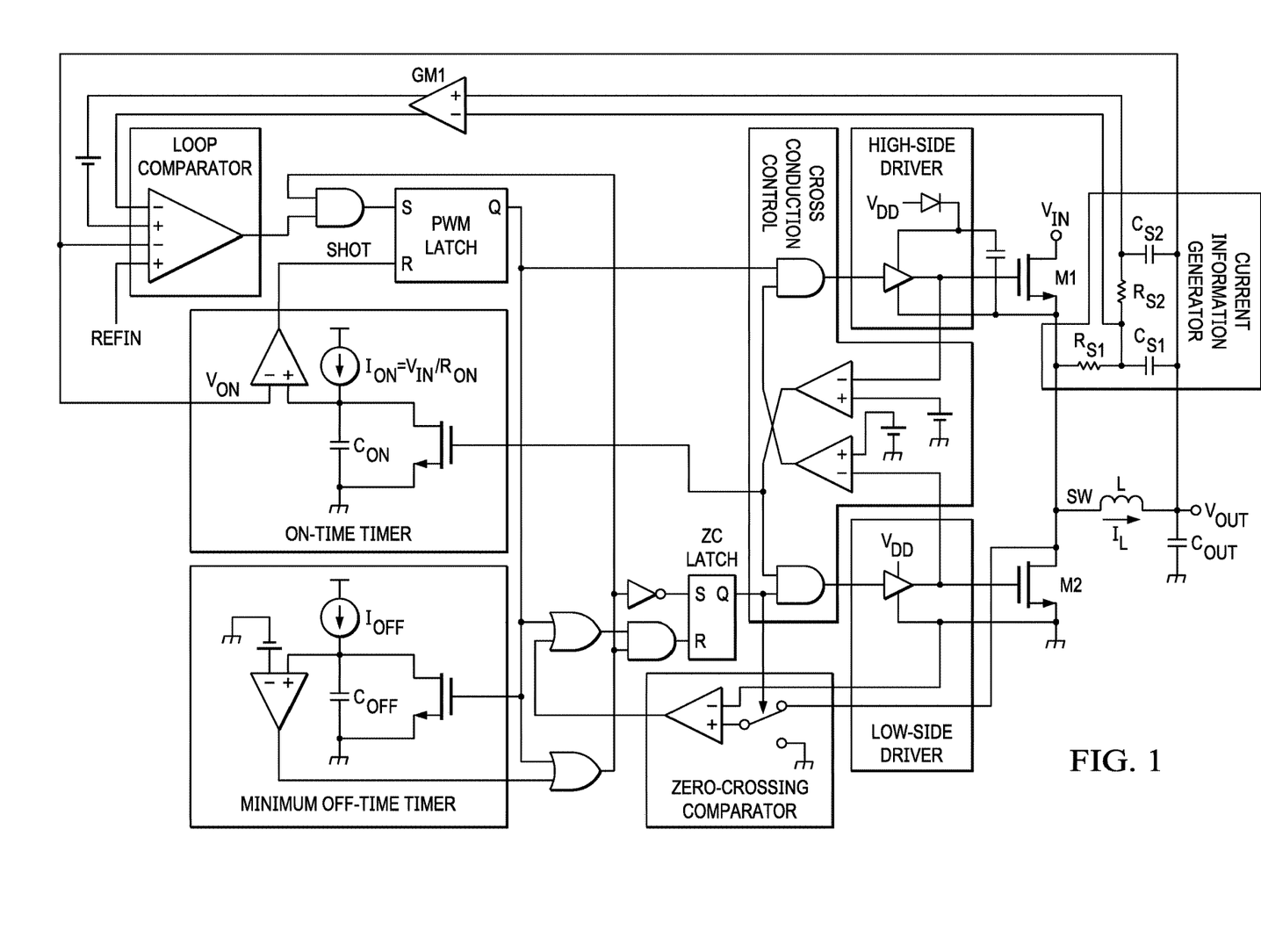
FIG. 1 is a schematic diagram showing a switching converter with a constant on-time controller in accordance with some examples.

FIG. 1 is a schematic diagram showing a switching converter with a constant on-time controller in accordance with some examples. In FIG. 1, the constant on-time controller corresponds to an on-time timer circuit and other components that determine when a high-side switch (M1) is turned on. More specifically, the switching converter includes M1 and a low-side switch (M2), where respective high-side and low-side drivers are used to generate drive signals for M1 and M2. The timing of the drive signals provided by the high-side and low-side drivers are based on respective control signals input into the high-side and low-side drivers. In operation, the control signals input into the high-side and low-side drivers are based on the operations of various circuits represented in FIG. 1, including: a current information generator circuit (e.g., with resistors Rs1 and Rs2, and with capacitors Cs1 and Cs2), a transconductance stage (GM1), a loop comparator, the on-time timer circuit, a minimum off-time timer circuit, a cross-conduction control circuit, a pulse-width modulation (PWM) latch, a zero crossing (ZC) latch, a zero-crossing comparator, and various logic gates (e.g., AND gates, OR gates, or inverters). While the on-time of M1 is a function of various signals (the output of the loop comparator, the output of the on-time timer circuit, the output of the minimum off-time timer circuit), the constant on-time controller of FIG. 1 corresponds to the on-time timer circuit.

In the example of FIG. 1, the on-time timer circuit is configured to generate a reset signal (SHOT) to reset the PWM latch so as to switch off M1 through the high-side driver when an on-time of M1 expires. The on-time of the on-time timer circuit is based on charging an on-time capacitor ($C_{ON}$) with a current ($I_{ON}$) from a current source until a voltage across $C_{ON}$ reaches a reference voltage ($V_{ON}$) that is proportional to the output voltage ($V_{OUT}$) of the switching converter. The charging is triggered based on voltage level at the switch node (SW).

Figure 2:
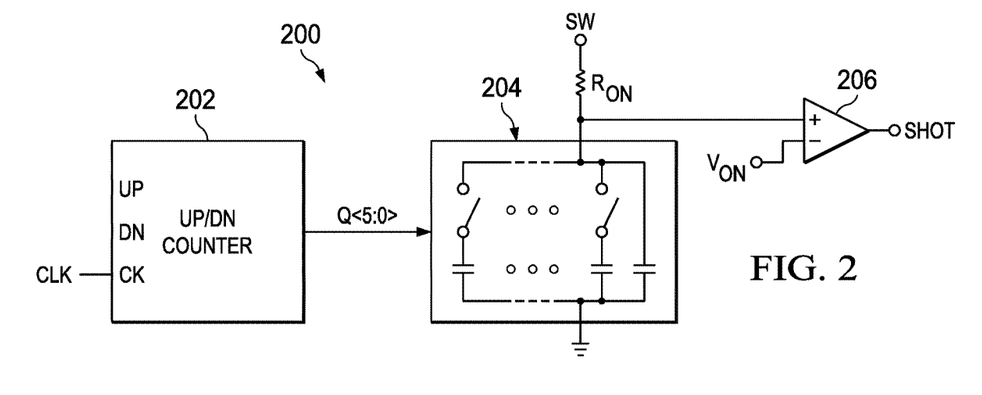
FIG. 2 is a diagram showing an on-time timer circuit for a switching converter with a constant on-time controller in accordance with some examples.

FIG. 2 is a diagram showing an on-time timer circuit 200 for a switching converter with a constant on-time controller (see e.g., the switching converter 100 in FIG. 1) in accordance with some examples. In the example of FIG. 2, the on-time timer circuit 200 includes an up/down counter 202, an on-time capacitor array 204, a comparator 206, and a resistor ($R_{ON}$). In a constant on-time controller architecture, functions such as ripple reduction are realized for some applications (e.g., when the load is light). In some examples, ripple of $V_{OUT}$ is reduced by increasing the system switching frequency through adjustment of the on-time of M1. In the example of FIG. 2, the on-time capacitor array 204 includes a plurality of on-time capacitors coupled in parallel. Each of the on-time capacitors is coupled to a respective switch in series. The up/down counter 202 controls a capacitance of the on-time capacitor array 204 based on the clock signal (CLK). For example, the up/down counter 202 is configured to generate a selection signal (Q<5:0>) to selectively switch on or off respective switches in the on-time capacitor array 204 to adjust the total capacitance so as to adjust the on-time of M1, where Q<5:0> is adjusted step by step based on CLK. In some examples, CLK is provided externally (e.g., by an oscillator), when adjusting capacitance of the on-time capacitor array 204 is needed. Note: the frequency of CLK is usually lower than a desired system switching frequency (the frequency of switching at SW).

Figure 3:
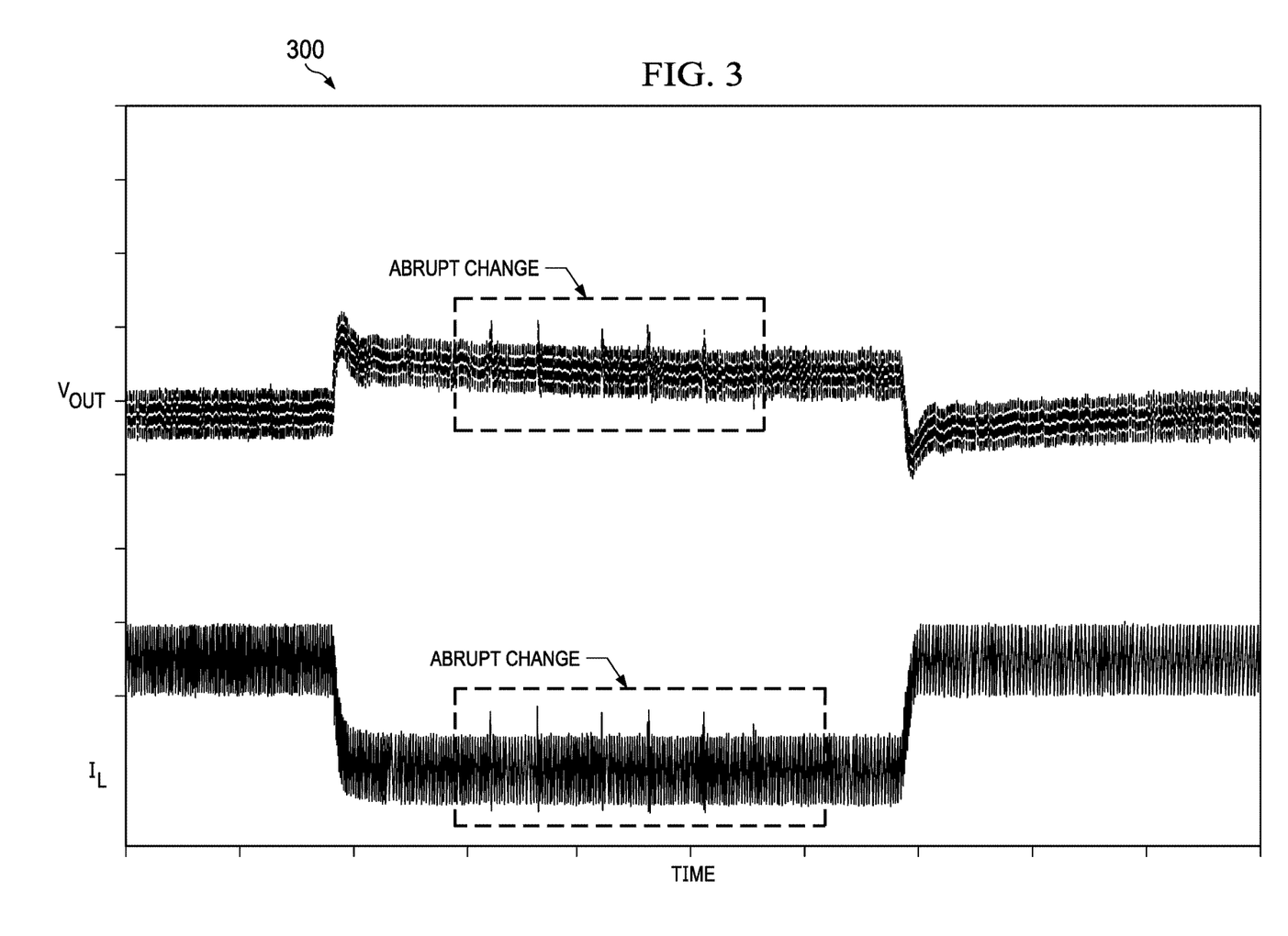
FIG. 3 is a timing diagram showing $V_{OUT}$ and $I_L$ waveforms of a switching converter with a constant on-time controller in forced continuous conduction mode (FCCM) in accordance with some examples.

FIG. 3 is a timing diagram 300 showing $V_{OUT}$ and $I_L$ (inductor current) waveforms of a switching converter with a constant on-time controller (see e.g., the switching converter 100 in FIG. 1) in forced continuous conduction mode (FCCM) in accordance with some examples. In FCCM, an on-time timer circuit (e.g., the on-time timer circuit 200 in FIG. 2) with the clock signal (e.g., CLK) of an up/down counter is provided by an external independent clock to adjust the capacitance of an on-time capacitor array so as to control the on-time. The external independent clock functions as a frequency lock that locks the switching converter to its desired system switching frequency. However, because the up/down counter uses the external clock directly, abrupt changes to the on-time occur as represented in the timing diagram 300, where abrupt changes in the on-time during transients results in poor load transient performance.

Figure 4:
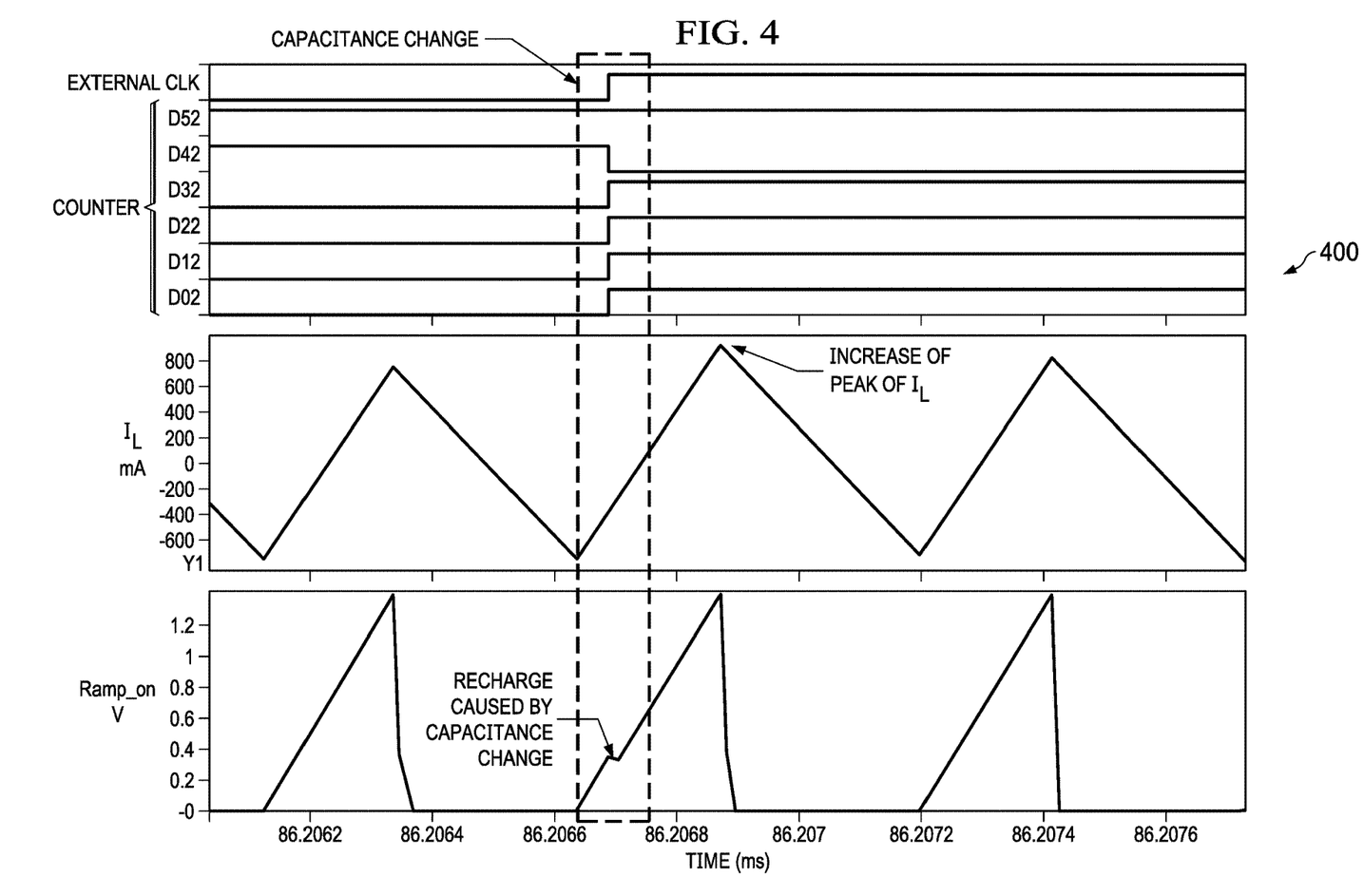
FIG. 4 is a timing diagram showing simulated waveforms of a switching converter with a constant on-time controller in FCCM in accordance with some examples.

FIG. 4 is a timing diagram 400 showing simulated waveforms of a switching converter with a constant on-time controller (see e.g., the switching converter 100 in FIG. 1) in FCCM in accordance with some examples. In the timing diagram 400, waveforms for an external clock signal (EXTERNAL CLK), a counter output signal (e.g., labeled "COUNTER", where Q<5:0> is an example), $I_L$, and a ramp on signal (Ramp_on) are represented to show the root cause of the on-time abrupt change issue. More specifically, if External CLK is asserted when M1 is on, due to COUNTER (e.g., Q<5:0>) generated by the up/down counter, one or more of the on-time capacitors that previously were charged will be disconnected from Ion while one or more capacitors that were previously disconnected from Ion will be selected and charged. Thus, the whole capacitor array will have to be partially recharged, which results in extra charging time. As represented in FIG. 4, capacitance changing during the on-time of M1 results in an increase of the peak of $I_L$ caused by the extra charging time due to recharge, which results in the abrupt on-time changes represented in the timing diagram 300 of FIG. 3. Also, Ramp_on is proportional to a voltage difference across the on-time capacitor array.

Figure 5:
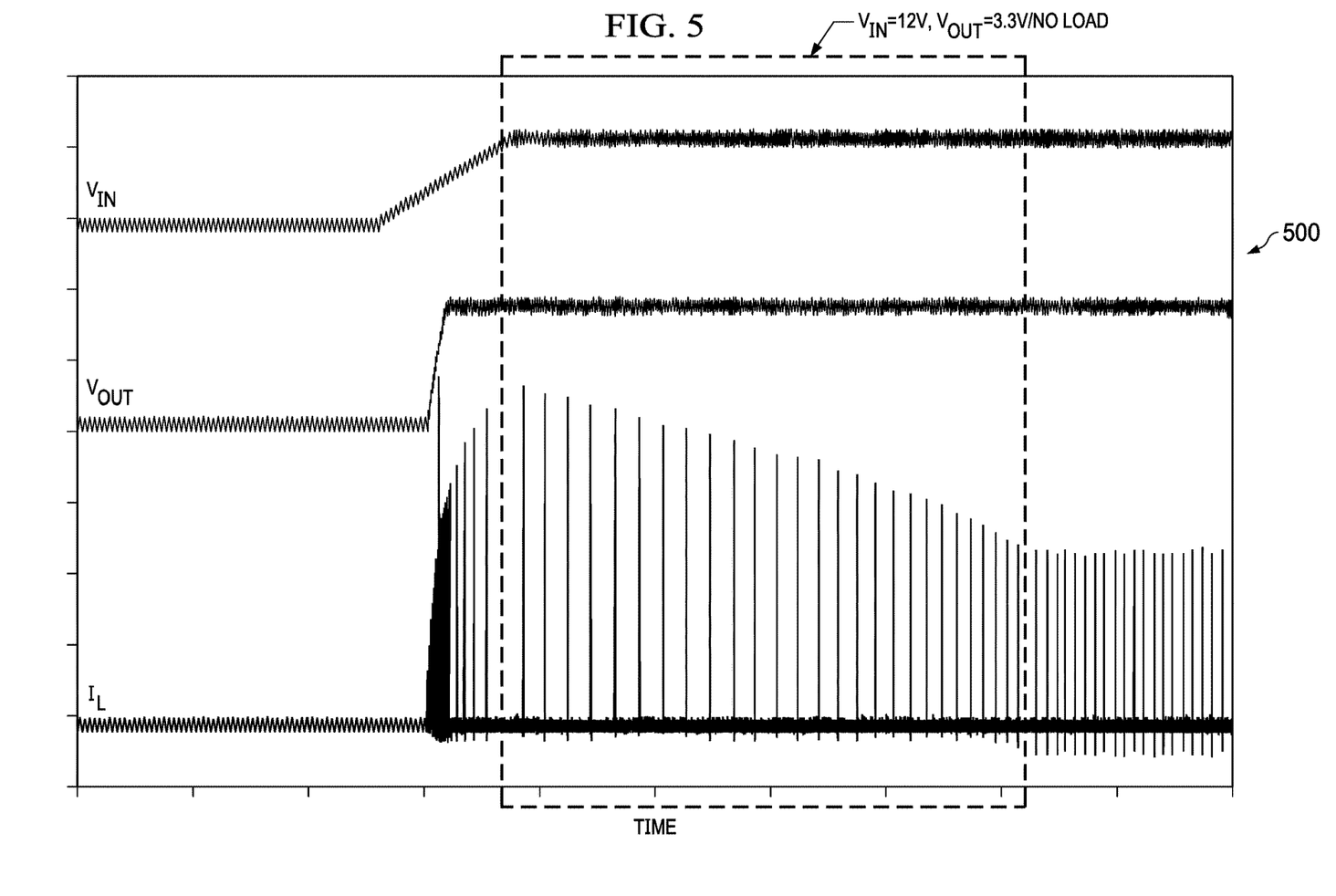
FIG. 5 is a timing diagram showing simulated waveforms of a switching converter with a constant on-time controller in discontinuous conduction mode (DCM) in accordance with some examples.

FIG. 5 is a timing diagram 500 showing simulated waveforms of a switching converter with a constant on-time controller (see e.g., the switching converter 100 in FIG. 1) in discontinuous conduction mode (DCM) in accordance with some examples. In the timing diagram 500, waveforms for the input supply voltage ($V_{IN}$), $V_{OUT}$, and $I_L$ of switching converter with a constant on-time controller operated in a pulse skip mode (PSM) or DCM are represented. In DCM, an on-time timer circuit (e.g., the on-time timer circuit 200 in FIG. 2) with the clock signal (e.g., CLK) of an up/down counter uses a system driving signal (e.g., the M2 on signal) to control the external clock and on-time capacitor array to achieve ripple reduction and out of audio (OOA) functions in DCM. The OOA function refers to adjusting the system switching frequency to be out of the audible range. Because the up/down counter adjusts the on-time by adjusting the total capacitance of the on-time capacitor array in a step down or step up mode, the duration of each step is based on a frequency of the system driving signal, which causes a long period of regulation time. In summary, for FCCM scenarios, on-time timer circuits (e.g., the on-time timer circuit 200 in FIG. 2) may suffer from abrupt on-time change issue and poor transient performance. Meanwhile, for DCM scenarios, on-time timer circuits (e.g., the on-time timer circuit 200 in FIG. 2) may suffer from a long regulation time, where the regulation time cannot be adjusted.

Figure 6:
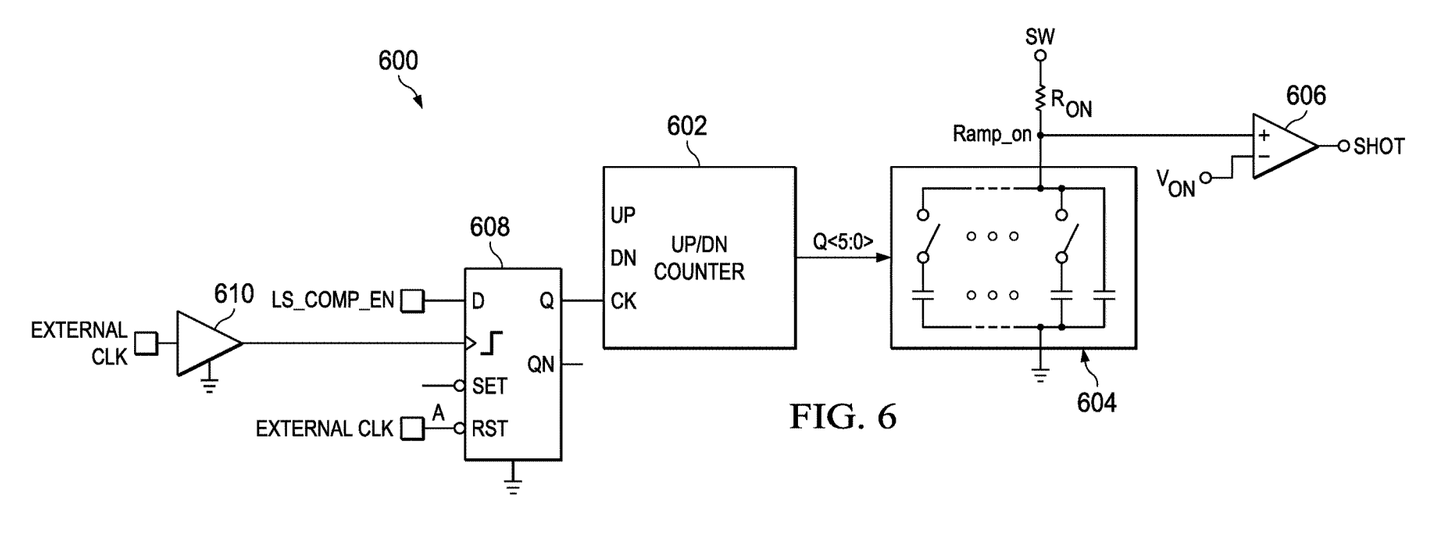
FIG. 6 is a diagram showing another on-time timer circuit for a switching converter with a constant on-time controller in FCCM in accordance with some examples.

FIG. 6 is a diagram showing another on-time timer circuit 600 for a switching converter with a constant on-time controller (e.g., replacing the on-time timer in the switching converter 100 in FIG. 1) in FCCM in accordance with some examples. In the on-time timer circuit 600, LS_COMP_EN is a signal indicating the completion of a low-side switch blanking time, which corresponds to the minimum off-time of M2. As shown, LS_COMP_EN is provided to the data (D) input of a D flip flop 608. Also, an external clock signal (EXTERNAL CLK) is provided to the clock terminal of the D flip flop 608 through a delay unit 610. In some examples, the delay unit 610 has a duty cycle no less than 50% and has a frequency lower than the system switching frequency (the frequency of switching at SW). Also, in some examples, the delay unit 610 is configured to avoid logic error (sometimes referred to as race and competition).

As shown, EXTERNAL CLK is also provided to a reset terminal of the D flip flop 608 such that the D flip flop 608 is reset when EXTERNAL CLK is de-asserted. The output of the D flip flop 608 is provided as a new clock of the up/down counter 602. Therefore, the new clock for the up/down counter 602 is only asserted when LS_COMP_EN is high so as to avoid capacitance change of the on-time capacitor array 604 during the on-time of M1. Using the completion of low side switch blanking time (indicated by LS_COMP_EN) can ensure the on-time capacitors of the on-time capacitor array 604 are completely discharged to zero. In the example of FIG. 6, the capacitance of the on-time capacitor array 604 is used to adjust a voltage value (Ramp_on) at the positive input of the comparator 606, where the comparator 606 provides SHOT based on a comparison of Ramp_on with $V_{ON}$.

Figure 7:
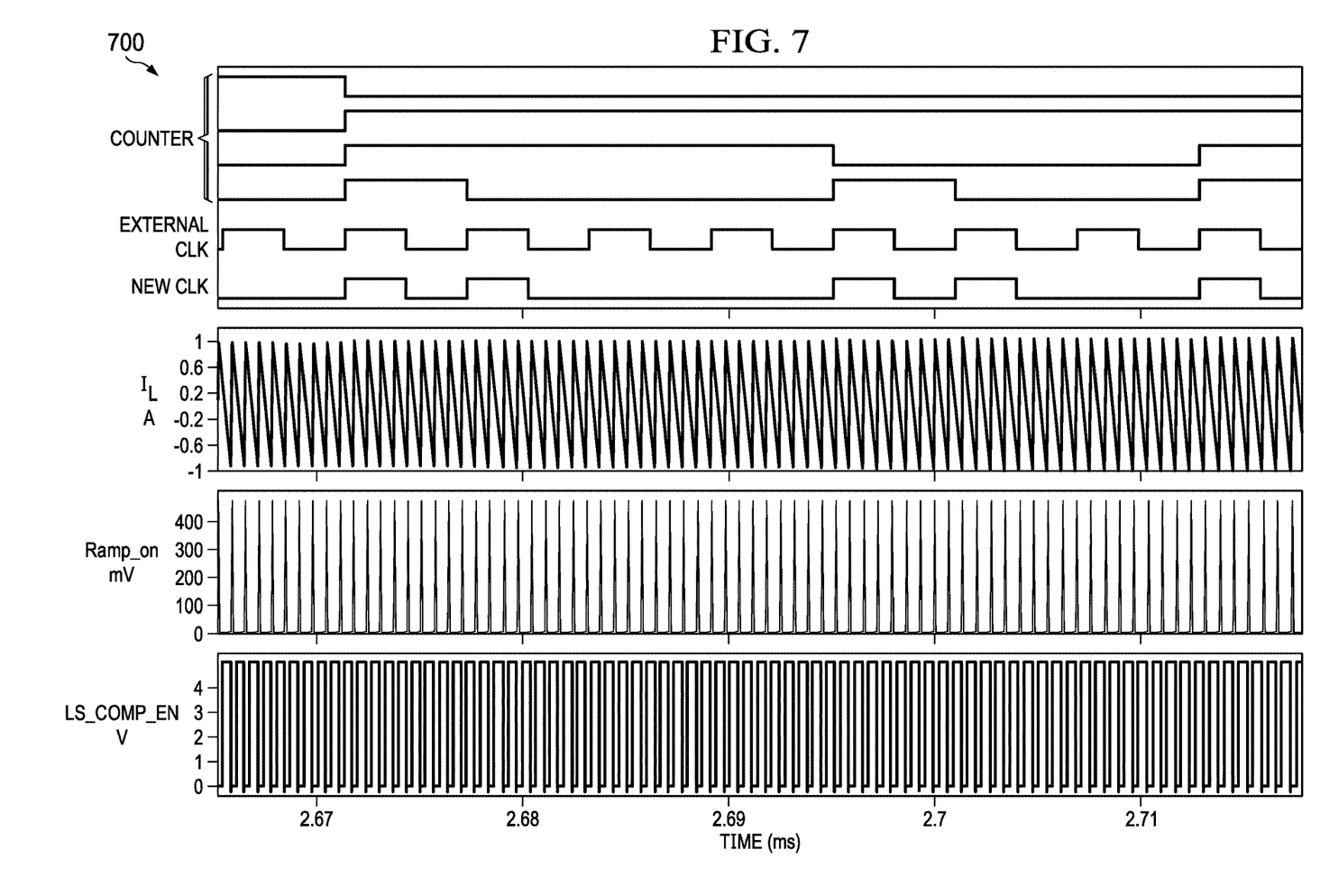
FIG. 7 is a timing diagram showing simulated waveforms of a switching converter with the on-time timer circuit in FCCM in accordance with some examples.

FIG. 7 is a timing diagram 700 showing simulated waveforms of a switching converter with the on-time timer circuit 600 in FCCM in accordance with some examples. In the timing diagram 700, waveforms for a counter output signal (e.g., labeled "COUNTER", where Q<5:0> is an example), an external clock signal (EXTERNAL CLK), a new clock signal (NEW CLK), $I_L$, a ramp on signal (Ramp_on), and a low-side switch blanking time completion signal (LS_COMP_EN) are represented. In this example, EXTERNAL CLK cannot trigger the up/down counter every cycle. If the rising edge of EXTERNAL CLK happens when LS_COMP_EN is low, the output of the D flip flop 608 is low.

Figure 8:
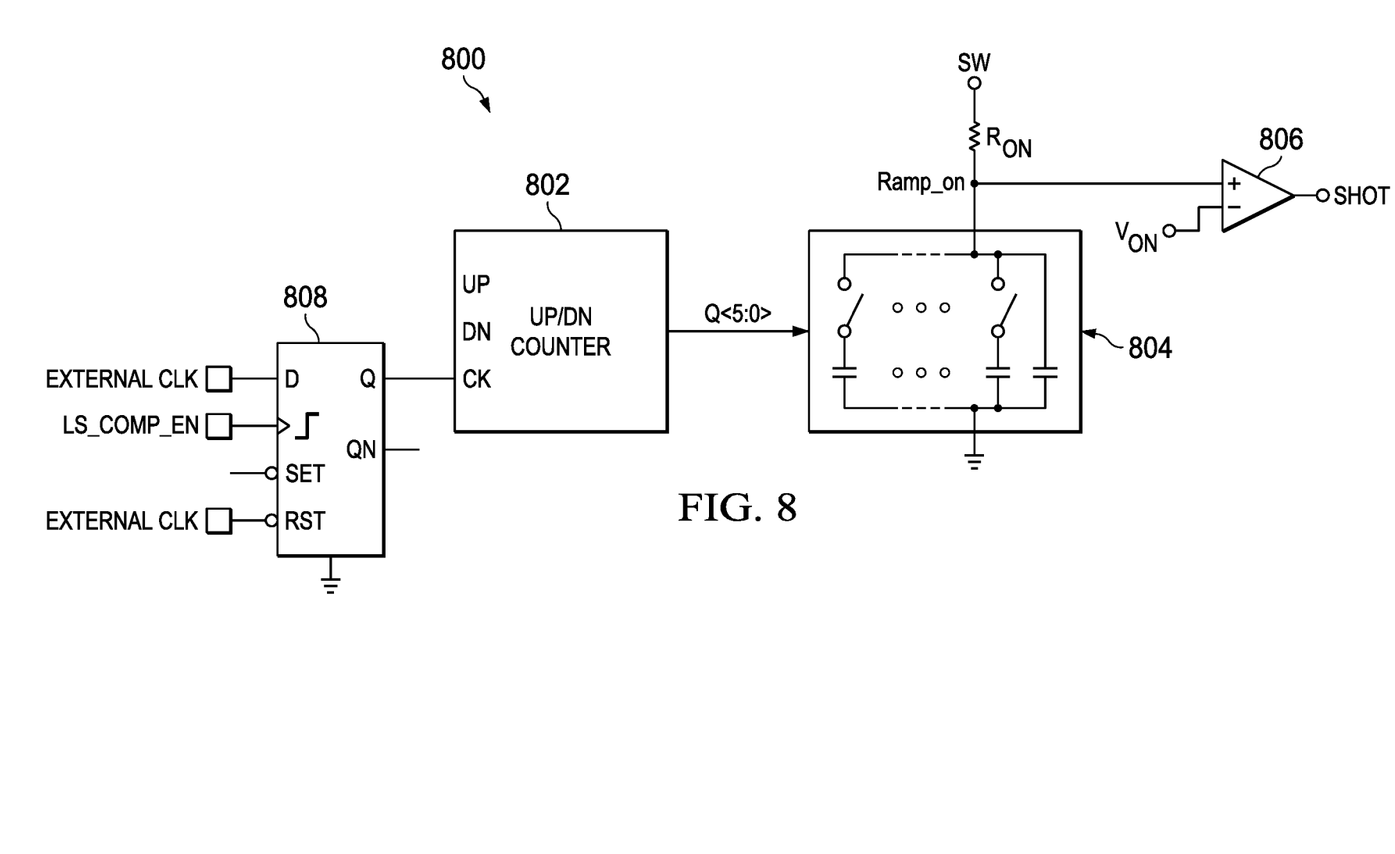
FIG. 8 is a diagram showing another on-time timer circuit for a switching converter with a constant on-time controller in FCCM in accordance with some examples.

FIG. 8 is a diagram showing another on-time timer circuit 800 (e.g., replacing the on-time timer in the switching converter 100 in FIG. 1) for a switching converter with a constant on-time controller in FCCM in accordance with some examples. As shown, the on-time timer circuit 800 includes an up/down counter 802 configured to provide a control signal (e.g., Q<5:0>) to an on-time capacitor array 804. In the example of FIG. 8, the capacitance of the on-time capacitor array 804 is used to adjust the value of Ramp_on at the positive input of the comparator 806, where the comparator 806 provides SHOT based on a comparison of Ramp_on with $V_{ON}$.

Compared with the on-time timer circuit 600, the on-time timer circuit 800 varies with regard to how NEW CLK is provided to an up/down counter. More specifically, in the example of FIG. 8, EXTERNAL CLK is provided to the data (D) input of a D flip flop 808 and is sampled by LS_COMP_EN, which has a frequency much higher than the frequency of EXTERNAL CLK. Therefore, the on-time timer circuit 800 can achieve a higher regulation speed compared to the on-time timer circuit 600 in FIG. 6.

Figure 9:
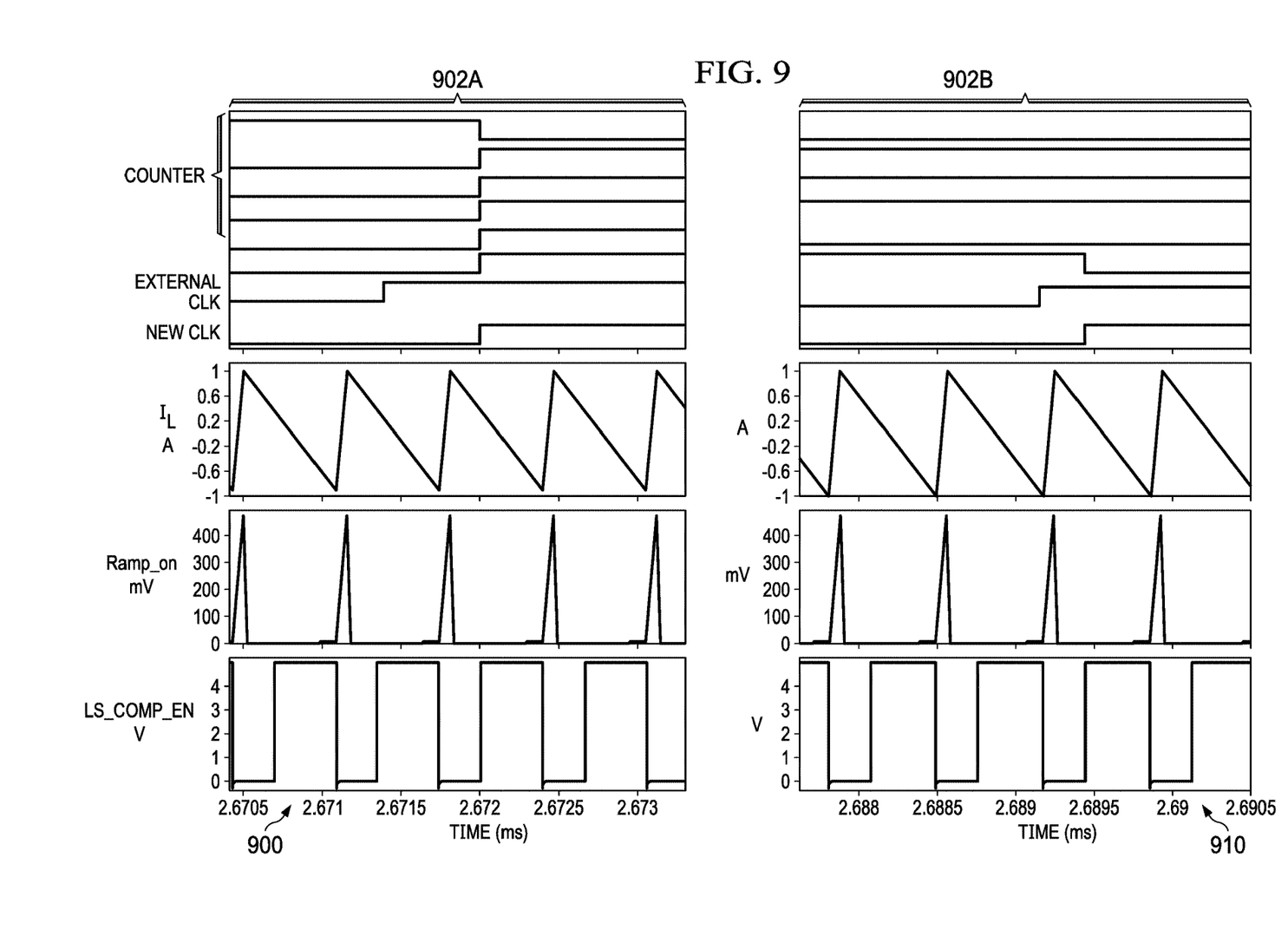
FIG. 9 is a timing diagram showing simulated waveforms of the switching converter with the constant on-time controller of FIG. 8 in FCCM in accordance with some examples.

FIG. 9 is a timing diagram 900 showing simulated waveforms of the switching converter with the constant on-time controller of FIG. 8 in FCCM in accordance with some examples. In the timing diagram 900, waveforms for a counter output signal (e.g., labeled "COUNTER", where Q<5:0> is an example), an external clock signal (EXTERNAL CLK), a new clock signal (NEW CLK), $I_L$, a ramp on signal (Ramp_on), and a low-side switch blanking time completion signal (LS_COMP_EN) are represented. In the timing diagram 900, the left portion 902A and the right portion 902B of FIG. 9 illustrate that NEW CLK is asserted by LS_COMP_EN when M1 is off regardless whether EXTERNAL CLK is asserted when M1 is off or on.

Figure 10:
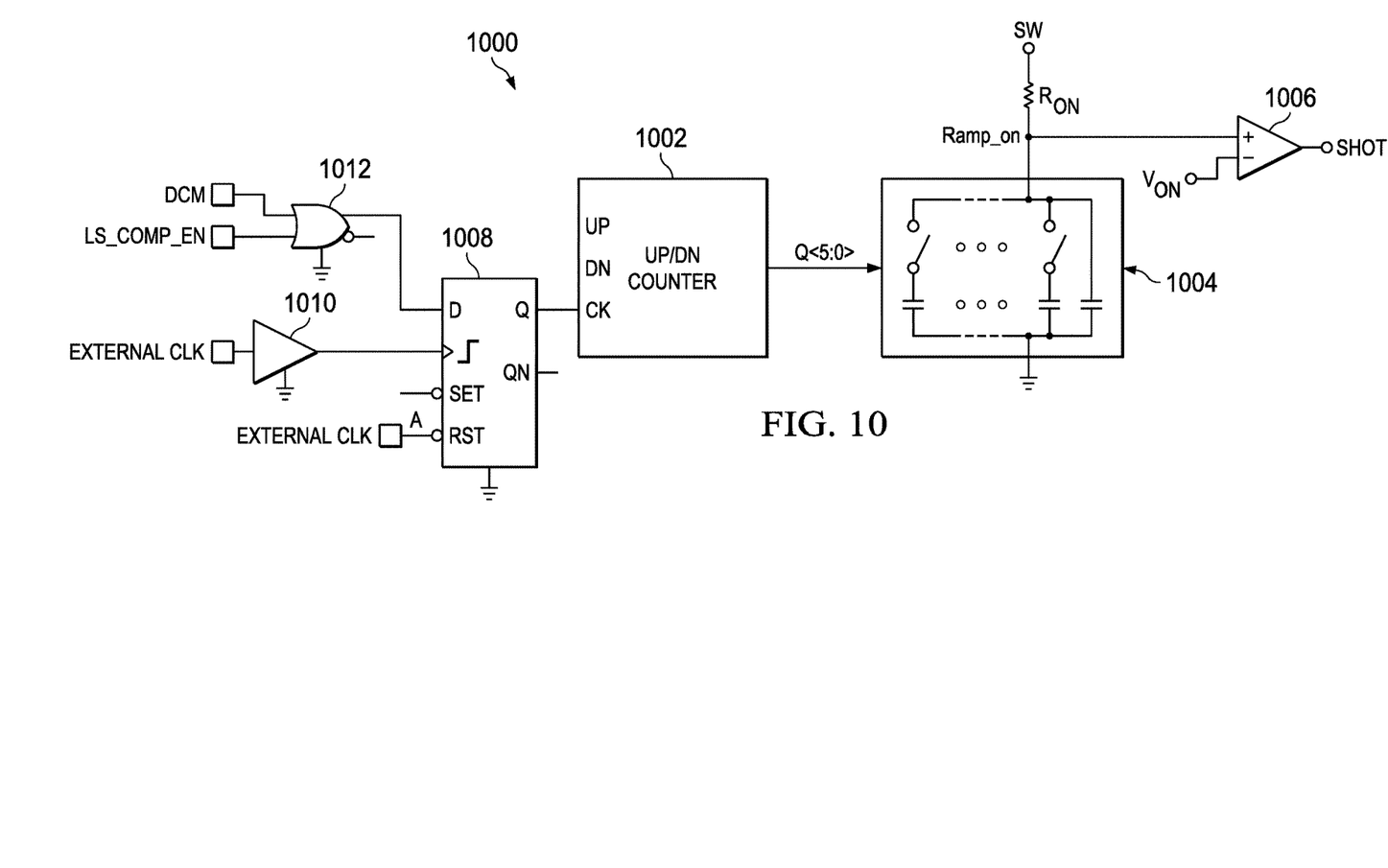
FIG. 10 is a diagram showing an on-time timer circuit for a switching converter with a constant on-time controller in DCM in accordance with some examples.

FIG. 10 is a diagram showing an on-time timer circuit 1000 for a switching converter with a constant on-time controller in DCM mode in accordance with some examples. As shown, the on-time timer circuit 1000 includes an up/down counter 1002 configured to provide a control signal (e.g., Q<5:0>) to an on-time capacitor array 1004. In the example of FIG. 10, the capacitance of the on-time capacitor array 1004 is used to adjust the value of Ramp_on at the positive input of the comparator 1006, where the comparator 1006 provides SHOT based on a comparison of Ramp_on with $V_{ON}$.

As shown, LS_COMP_EN or a DCM signal is forwarded to the data (D) input of a D flip flop 1008 via an OR gate 1012. Also, an external clock signal (EXTERNAL CLK) is provided to the clock terminal of the D flip flop 1008 through a delay unit 1010. In some examples, the delay unit 1010 has a duty cycle no less than 50% and has a frequency lower than the system switching frequency (the frequency of switching at SW). Also, in some examples, the delay unit 1010 is configured to avoid race and competition.

As shown, EXTERNAL CLK is also provided to a reset terminal of the D flip flop 1008 such that the D flip flop 1008 is reset when EXTERNAL CLK is de-asserted. The output of the D flip flop 1008 is provided as a new clock of the up/down counter 1002. Therefore, the new clock for the up/down counter 1002 is only asserted when LS_COMP_EN or DCM is high so as to avoid capacitance change of the on-time capacitor array 604 during the on-time of M1. Using the completion of low side switch blanking time (indicated by LS_COMP_EN) can ensure the on-time capacitors of the on-time capacitor array 604 are completely discharged to zero. With the DCM signal, the up/down counter 1002 can be enabled in a continuous working mode as well as a discontinuous working mode. Similar to the on-time timer circuit 600 of FIG. 6, the on-time timer circuit 1000 uses EXTERNAL CLK to adjust the capacitance of an on-time capacitor array (e.g., the on-time capacitor array 1004), therefore the regulation time can be controlled based on the frequency of EXTERNAL CLK and a reduced regulation time is achieved. In this manner, the on-time timer circuit 1000 can realize an OOA function in less regulation time compared to the on-time timer circuit 600 of FIG. 6.

Figure 11:
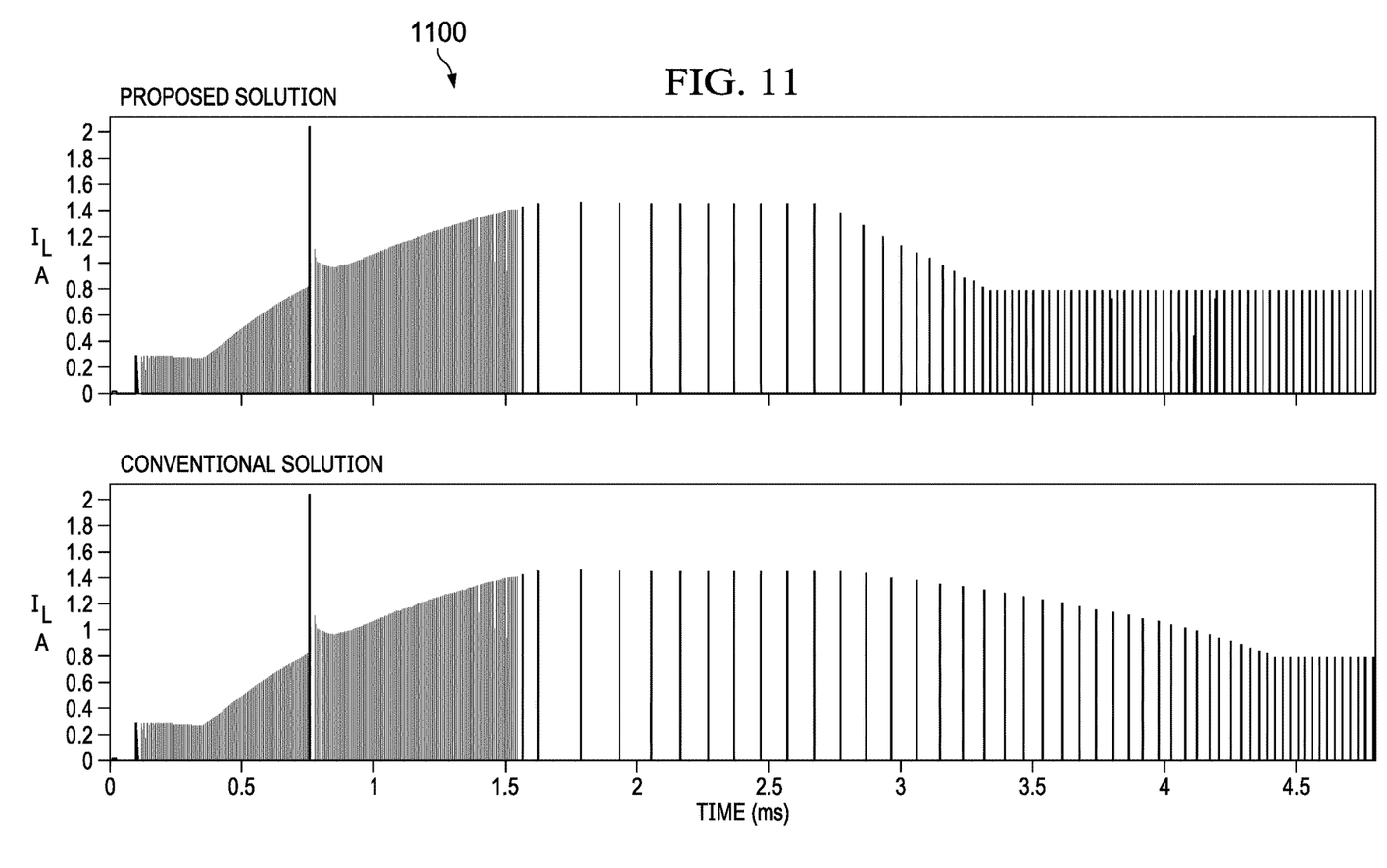
FIG. 11 is a timing diagram showing simulated waveforms of the switching converter with the constant on-time controller of FIG. 10 in DCM in accordance with some examples.

FIG. 11 is a timing diagram 1100 showing simulated $I_L$ waveforms with and without a proposed on-time timer circuit in DCM in accordance with some examples. As represented in the timing diagram 1100, the proposed solution realizes OOA function in less regulation time.

Figure 12:
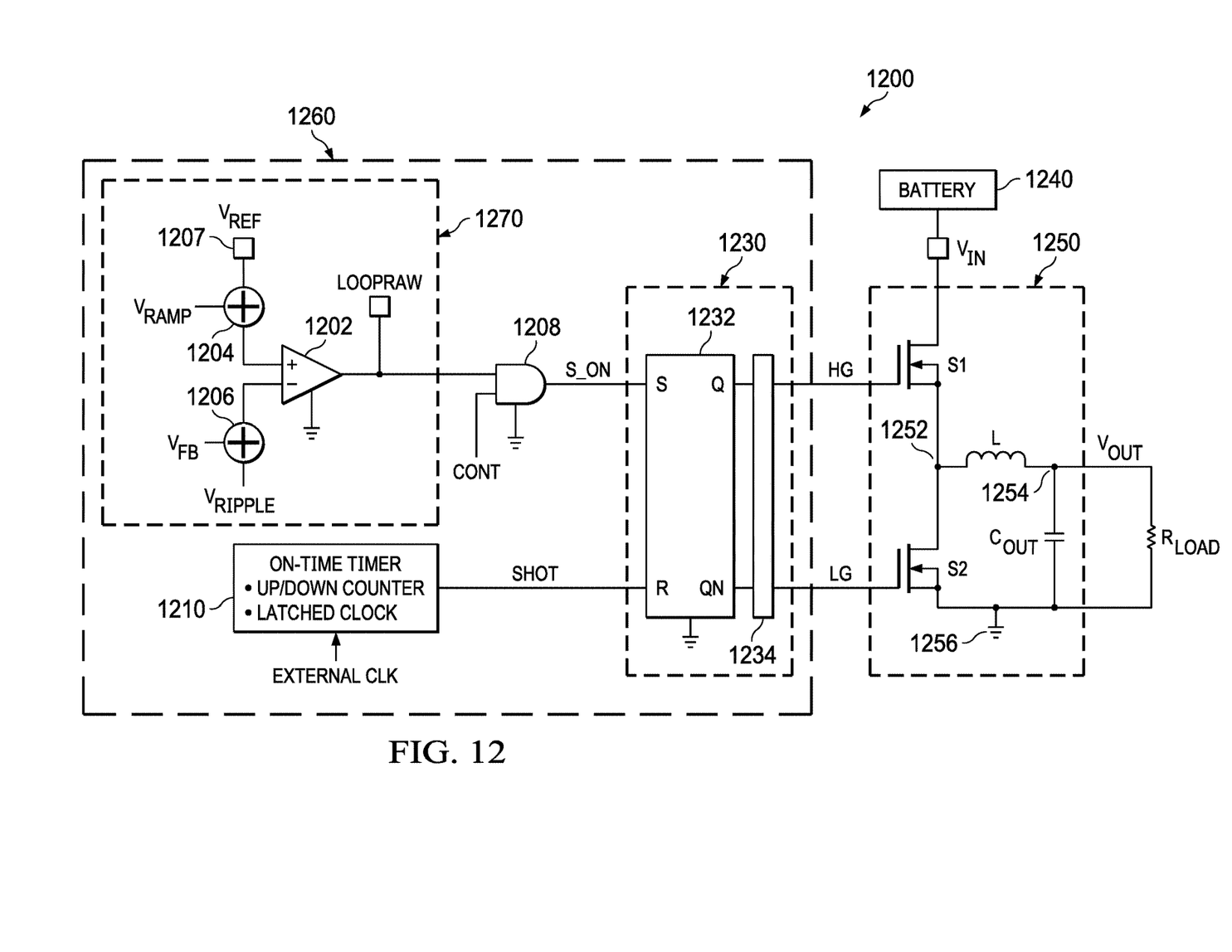
FIG. 12 is a block diagram of an electrical system in accordance with some examples.

FIG. 12 is a block diagram of an electrical system 1200 in accordance with some examples. As shown, the electrical system 1200 includes switching converter circuitry 1250 and a control circuit 1260 for one or more power switches (e.g., S1 or S2) of the switching converter circuitry 1250. In the example of FIG. 12, the switching converter circuitry 1250 corresponds to a buck converter topology with a high-side switch (S1), a low-side switch (S2), an inductor (L), and an output capacitor ($C_{OUT}$). In other examples, the switching converter circuitry 1250 could have a boost converter topology, or another switching converter topology.

As shown, S1 and S2 are coupled between a battery 1240 configured to provide $V_{IN}$ and a ground node 1256. Also, a first end of L is coupled to a switch node 1252 between S1 and S2. Also, a second end of L is coupled to an output node 1254. Also, $C_{OUT}$ and a load (RLOAD) are coupled in parallel between the output node 1254 and a ground node. In a first phase (S1 on, S2 off) of the switching converter circuitry 1250, the inductor current ($I_L$) ramps up. In a second phase (S1 off, S2 on), $I_L$ ramps down. To regulate $V_{OUT}$ at the output node 1254, the timing of the first and second phases is controlled by the control circuit 1260. As the $V_{IN}$ provided by the battery 1240 drops, the control circuit 1260 adjusts the timing of the first and second phases to account for this change (e.g., by increasing the total amount of first phase time subject to certain limits such as a minimum off-time).

In the example of FIG. 12, the timing of the first phase and the second phase are a function of various signals including a first control signal (LOOPRAW) output from a summing comparator circuit 1270 and a second control signal (SHOT) output from an on-time timer circuit 1210. In some examples, the on-time timer circuit 1210 provides SHOT based on an up/down counter with a latched clock input (see e.g., the on-time timer circuit 600 in FIG. 6, the on-time timer circuit 800 in FIG. 8, the on-time timer circuit 1000 in FIG. 10). In some examples, the latched clock input of the up/down counter is based in part on an external clock (e.g., External CLK in FIGS. 6, 8, and 10).

In some examples, LOOPRAW indicates when to turn S1 on (i.e., LOOPRAW is used to generate a switch on signal, S_ON). Meanwhile, SHOT indicates when to turn S1 off. More specifically, S_ON is output from an AND gate 1208 that receives LOOPRAW and a minimum off-time signal (CONT) to ensure S_ON is off for a minimum off-time. Thus, when LOOPRAW and CONT are high, S_ON is high. Otherwise, when either or both of LOOPRAW or CONT are low, S_ON is low. In some examples, CONT is provided by a minimum off-time signal generator (not shown). Often the minimum off-time is a fixed value in an IC specification. When the minimum off-time of the low-side switch arrives, CONT is asserted.

In the example of FIG. 12, S_ON is provided to a latch 1232. The latch 1232 is coupled to is part of (as shown) a switch driver circuit 1230 configured to provide a high-side drive signal (HG) to S1 and to provide a low-side drive signal (LG) to S2. For example, the Q and QN outputs of the latch 1232 can be provided to a driver circuit 1234, which is configured to provide sufficient current to drive S1 and S2. Thus, when the latch 1232 receives S_ON, the switch driver circuit 1230 directs the switching converter circuitry 1250 to transition to phase 2 (S1 off, S2 on). In some examples, the latch 1232 is an SR latch with a set (S) input node and a reset (R) input node, where the R input node is configured to receive SHOT from the on-time timer circuit 1210.

In the example of FIG. 12, the summing comparator circuit 1270 comprises a comparator 1202 that compares a feedback voltage (VFB) with a target reference voltage (VREF). More specifically, the positive input node of the comparator 1202 is configured to receive VREF from a voltage reference source 1207. Meanwhile, the negative input node of the comparator 1202 is configured to receive VFB (e.g., via a feedback loop that connects to the output node 1254 of the switching converter circuitry 1250). Also, VREF may be modified based on a ramp compensation signal (Vramp) that is selectively applied to VREF by an adder circuit 1204. Also, VFB may be modified based on a ripple signal (Vripple) that is applied to VFB by the adder circuit 1206.

In some examples, an electrical system (e.g., the electrical system 1200 in FIG. 12) includes a battery (e.g., the battery 1240 in FIG. 12) configured to provide an input supply voltage ($V_{IN}$). The electrical system also includes a switching converter (e.g., the switching converter circuitry 1250 in FIG. 12) coupled to the battery, where the switching converter includes a power switch (e.g., S1 or S2 in FIG. 12). The electrical system also includes a load (e.g., RLOAD in FIG. 12) coupled to an output of the switching converter. The electrical system also includes a control circuit 1260 coupled to the power switch. The control circuit includes a switch driver circuit (e.g., the switch driver circuit 1230 in FIG. 12) coupled to the power switch. The control circuit also includes summing comparator circuit (e.g., the summing comparator circuit 1270 in FIG. 12) configured to output a first control signal (e.g., LOOPRAW in FIG. 12) that indicates when to turn the power switch on. The control circuit also includes an on-time timer circuit (e.g., the on-time timer circuit 1210 in FIG. 12) configured to output a second control signal (e.g., SHOT in FIG. 12) separate from the first control signal, wherein the second control signal is based on a latched external clock signal (e.g., EXTERNAL CLK in FIG. 6, 8, or 10).

In some examples, the on-time timer circuit includes an up/down counter (e.g., the up/down counters in FIGS. 6, 8, and 10) and a latch (e.g., the D flip flop in FIGS. 6, 8, and 10), wherein an output of the latch is coupled to a clock input of the up/down counter. In some examples, the on-time timer circuit further comprises a delay circuit (the delay unit 610 in FIG. 6, or the delay unit 1010 in FIG. 10), and wherein the latch comprises a D flip flop (e.g., the D flip flop 608 in FIG. 6) having a data input node, a clock input node coupled to an output of the delay circuit, and a reset input node. Also, the data input node of the D flip flop is configured to receive a low-side switch blanking time completion signal (e.g., LS_COMP_EN in FIGS. 6, 8, and 10). Also, the external clock signal is coupled to an input of the delay circuit and to the reset input node of the D flip flop.

In some examples, the on-time timer circuit also includes an OR gate (e.g., the OR gate 1012 in FIG. 10) with an output coupled to the data input node, wherein the OR gate is configured to receive the low-side switch blanking time completion signal and a DCM signal as inputs. In some examples, the latch includes a D flip flop (e.g., the D flip flop 808 in FIG. 8) having a data input node, a clock input node, and a reset input node, where the data input node and the reset input node are configured to receive the external clock signal, and where the clock input node is configured to receive a low-side switch blanking time completion signal (e.g., LS_COMP_EN in FIGS. 6, 8, and 10).

In some examples, the on-time timer circuit also includes a comparator (e.g., the comparator in FIGS. 6, 8, and 10). In some examples, the on-time timer circuit also includes an on-time capacitor array (e.g., the on-time capacitor array in FIGS. 6, 8, and 10) with a control terminal, a first terminal, and a second terminal, wherein the control terminal is coupled to an output of the up/down counter, wherein the first terminal is coupled to an input of the comparator, and wherein the second terminal is coupled to a ground node. In some examples, the external clock is provided by an external source is independent of a converter's switching frequency.

In some examples, a switching converter (e.g., an integrated circuit, a chip, or printed circuit board with integrated circuit components and/or discrete components) includes a power switch (e.g., S1 or S2 in FIG. 12) and a control circuit (e.g., control circuit 1260 in FIG. 12) coupled to the power switch. The control circuit includes a switch driver circuit (e.g., the switch driver circuit 1230 in FIG. 12) and a summing comparator circuit (e.g., the summing comparator circuit 1270 in FIG. 12) coupled to the switch driver circuit. The control circuit also includes an on-time timer circuit (e.g., the on-time timer circuit 1210 in FIG. 12, or the on-time timer circuits 600, 800, or 1000 in FIG. 6, 8, or 10) coupled to the switch driver circuit. The on-time timer circuit includes an up/down counter (e.g., the up/down counter of FIGS. 6, 8, and 10) with a clock input node. The on-time timer circuit also includes a latch (e.g., the D flip flop in FIG. 6, 8, or 10) with an input coupled to an external clock signal (e.g., EXTERNAL CLK in FIG. 6, 8, or 10) and with an output coupled to the clock input node. The on-time timer circuit also includes an on-time capacitor array (e.g., the on-time capacitor array in FIG. 6, 8, or 10) with a control terminal coupled an output of the up/down counter.

In some examples, the on-time timer circuit also includes a delay circuit (e.g., the delay until 610 in FIG. 6, or the delay unit 1010 in FIG. 10), and wherein the latch includes a D flip flop having: a data input node, a clock input node coupled to an output of the delay circuit, and a reset input node (see e.g., the D flip flop 608 of FIG. 6), wherein the data input node is configured to receive a low-side switch blanking time completion signal (e.g., LS_COMP_EN in FIG. 6), and wherein the external clock signal is coupled to an input of the delay circuit and to the reset input node. In some examples, the on-time timer circuit also includes comprises an OR gate (e.g., the OR gate 1012 in FIG. 10) with an output coupled to the data input node, wherein the OR gate is configured to receive the low-side switch blanking time completion signal and a DCM signal as inputs. In some examples, the latch includes a D flip flop (e.g., the D flip flop 808 in FIG. 8) having a data input node, a clock input node, and a reset input node, where the data input node and the reset input node are configured to receive the external clock signal, and where the clock input node of the D flip flop is configured to receive a low-side switch blanking time completion signal. In some examples, the external clock signal is provided by an external source independent of a converter's switching frequency.

In some examples, the switching converter also includes an AND gate (e.g., the AND gate 1208 in FIG. 12), where a first input node of the AND gate is coupled to an output of the summing comparator circuit (e.g., the summing comparator circuit 1270 in FIG. 12), and where a second input node of the AND gate is coupled to a minimum off-time control signal (e.g., CONT in FIG. 12). In some examples, the switch driver circuit comprises an SR latch (e.g., the SR latch 1232 in FIG. 12), where a set input node of the SR latch is coupled to an output of the AND gate, where a reset input node of the SR latch is coupled to an output of an OR gate (e.g., the OR gate 1216 in FIG. 12), and where an output of the on-time timer circuit is input to the OR gate. In some examples, the OR gate is configured to receive a maximum on-time control signal (e.g., HTO in FIG. 12) as an input.

In some examples, the on-time timer circuits as disclosed herein are parts of a switching converter controller (e.g., an integrated circuit or chip) designed to provide the control signals (e.g., HG and LG) for use by power switches (e.g., S1 and S2) of a switching converter. In such examples, different on-time timer circuits (see e.g., FIGS. 6, 8, 10) are possible, and are compatible with other control options of a control circuit (e.g., the control circuit 1260 in FIG. 12).

The technical advantages of the proposed on-time timer circuit options includes, but are not limited to, resolution of issues such as abrupt on-time changes. In some examples, this is accomplished by adjustment of an on-time capacitor array based on the completion of low side switch blanking time signal (e.g., LS_COMP_EN). This solution can realize ripple reduction, OOA, and frequency lock functions more efficiently, which provides a more competitive switching converter and related products. The proposed on-time timer options may be used for all power converters with constant on-time control.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. An electrical system, comprising:
a battery configured to provide an input supply voltage;
a switching converter coupled to the battery, the switching converter includes a power switch;
a load coupled to an output of the switching converter;
a control circuit coupled to the power switch, the control circuit including:
a switch driver circuit coupled to the power switch;
a summing comparator circuit configured to output a first control signal that indicates when to turn the power switch on; and
an on-time timer circuit configured to output a second control signal separate from the first control signal, the second control signal is based on a latched external clock signal, the on-time timer circuit including a delay circuit, and the latch includes a D flip flop having:
a data input node;
a clock input node coupled to an output of the delay circuit; and
a reset input node,
the data input node is configured to receive a low-side switch blanking time completion signal, and
the external clock signal is coupled to an input of the delay circuit and to the reset input node.

2. The electrical system of claim 1, in which the on-time timer circuit includes an up/down counter and a latch, an output of the latch is coupled to a clock input of the up/down counter.

3. The electrical system of claim 2 in which the on-time timer circuit includes an OR gate with an output coupled to the data input node, the OR gate is configured to receive the low-side switch blanking time completion signal and a discontinuous conduction mode (DCM) signal as inputs.

4. The electrical system of claim 2, in which the latch includes a D flip flop having:
   a data input node;
   a clock input node; and
   a reset input node,
   the data input node and the reset input node are configured to receive the external clock signal, and
   the clock input node is configured to receive a low-side switch blanking time completion signal.

5. The electrical system of claim 2, in which the on-time timer circuit includes:
   a comparator; and
   an on-time capacitor array with a control terminal, a first terminal, and a second terminal, the control terminal is coupled to an output of the up/down counter, the first terminal is coupled to an input of the comparator, and the second terminal is coupled to a ground node.

6. The electrical system of claim 1, in which the external clock is provided by an external source independent of a switching frequency of the switching converter.

7. A switching converter, comprising:
   a power switch;
   a control circuit coupled to the power switch, the control circuit including:
   a switch driver circuit;
   a summing comparator circuit coupled to the switch driver circuit;
   an on-time timer circuit coupled to the switch driver circuit, the on-time timer circuit including:
      an up/down counter with a clock input node;
      a latch with an input coupled to an external clock signal and with an output coupled to the clock input node; and
      an on-time capacitor array with a control terminal coupled an output of the up/down counter.

8. The switching converter of claim 7, in which the on-time timer circuit includes a delay circuit, and the latch including a D flip flop having:
   a data input node;
   a clock input node coupled to an output of the delay circuit; and
   a reset input node,
   the data input node is configured to receive a low-side switch blanking time completion signal, and
   the external clock signal is coupled to an input of the delay circuit and to the reset input node.

9. The switching converter of claim 8, in which the on-time timer circuit includes an OR gate with an output coupled to the data input node, the OR gate is configured to receive the low-side switch blanking time completion signal and a discontinuous conduction mode (DCM) signal as inputs.

10. The switching converter of claim 7, in which the latch includes a D flip flop having:
    a data input node;
    a clock input node; and
    a reset input node,
    the data input node and the reset input node are configured to receive the external clock signal, and
    the clock input node of the D flip flop is configured to receive a low-side switch blanking time completion signal.

11. The switching converter of claim 7, in which the external clock signal is provided by an external source independent of a switching frequency of the switching converter.

12. The switching converter of claim 7, including an AND gate, a first input node of the AND gate is coupled to an output of the summing comparator circuit, and a second input node of the AND gate is coupled to a minimum off-time control signal.

13. The switching converter of claim 12, in which the switch driver circuit includes an SR latch, a set input node of the SR latch is coupled to an output of the AND gate, a reset input node of the SR latch is coupled to an output of an OR gate, and an output of the on-time timer circuit is input to the OR gate.

14. The switching converter of claim 13, in which the OR gate is configured to receive a maximum on-time control signal as an input.

15. A switching converter controller, comprising:
    an on-time timer circuit; and
    a switch driver circuit coupled to the on-time timer circuit, the on-time timer circuit including:
    an up/down counter with a clock input node;
    a latch with an input coupled to an external clock signal and with an output coupled to the clock input node; and
    an on-time capacitor array with a control terminal coupled an output of the up/down counter.

16. The switching converter controller of claim 15, in which the on-time timer circuit includes a delay circuit, and the latch including a D flip flop having:
    a data input node;
    a clock input node coupled to an output of the delay circuit; and
    a reset input node,
    the data input node is configured to receive a low-side switch blanking time completion signal, and
    the external clock signal is coupled to an input of the delay circuit and to the reset input node.

17. The switching converter controller of claim 16, in which the on-time timer circuit includes an OR gate with an output coupled to the data input node, the OR gate is configured to receive the low-side switch blanking time completion signal and a discontinuous conduction mode (DCM) signal as inputs.

18. The switching converter controller of claim 15, in which the latch includes a D flip flop having:
    a data input node;
    a clock input node; and
    a reset input node,
    the data input node and the reset input node are configured to receive the external clock signal, and
    the clock input node of the D flip flop is configured to receive a low-side switch blanking time completion signal.

19. The switching converter controller of claim 15, in which the external clock signal is provided by an external source independent of a switching frequency of the switching converter.

* * * * *